United States Patent
Tian et al.

(10) Patent No.: US 11,456,641 B2
(45) Date of Patent: Sep. 27, 2022

(54) STATOR ASSEMBLY, MOTOR AND VEHICLE

(71) Applicant: BYD COMPANY LIMITED, Shenzhen (CN)

(72) Inventors: Kaili Tian, Shenzhen (CN); Bin You, Shenzhen (CN); Wenming Qi, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 254 days.

(21) Appl. No.: 16/652,324

(22) PCT Filed: Sep. 29, 2018

(86) PCT No.: PCT/CN2018/108589
§ 371 (c)(1),
(2) Date: Mar. 30, 2020

(87) PCT Pub. No.: WO2019/062896
PCT Pub. Date: Apr. 4, 2019

(65) Prior Publication Data
US 2020/0235622 A1 Jul. 23, 2020

(30) Foreign Application Priority Data

Sep. 29, 2017 (CN) .......................... 201710912479.X

(51) Int. Cl.
*H02K 3/12* (2006.01)
*H02K 1/16* (2006.01)
*H02K 3/48* (2006.01)

(52) U.S. Cl.
CPC ................. *H02K 3/12* (2013.01); *H02K 1/16* (2013.01); *H02K 3/48* (2013.01)

(58) Field of Classification Search
CPC .. H02K 1/16; H02K 3/12; H02K 3/34; H02K 3/347; H02K 3/38

(Continued)

(56) References Cited

U.S. PATENT DOCUMENTS

| 6,252,327 | B1 * | 6/2001 | Matsuzaki | ............... | H02K 3/12 |
| | | | | | 310/201 |
| 9,018,822 | B2 * | 4/2015 | Okimitsu | ................. | H02K 3/12 |
| | | | | | 310/260 |

(Continued)

FOREIGN PATENT DOCUMENTS

| CN | 101552498 A | 10/2009 |
| CN | 102263451 A | 11/2011 |

(Continued)

OTHER PUBLICATIONS

Chen et al., English Machine Translation of CN101552498 (Year: 2009).*

(Continued)

*Primary Examiner* — Rashad H Johnson
(74) *Attorney, Agent, or Firm* — Anova Law Group, PLLC

(57) ABSTRACT

A stator assembly, a motor, and a vehicle are disclosed. The stator assembly includes: a cylindrical stator core, where multiple stator slots spaced out along a circumferential direction of the stator core exist on the stator core; and a stator winding, where the stator winding includes multiple conductor segments. Each conductor segment includes an intra-slot part disposed in a stator slot of the stator core, and a first end and a second end that are disposed outside the stator core. The intra-slot part is connected between the first end and the second end, and the second ends of the multiple conductor segments form a welding end. All lead-out lines of each phase of the stator winding are located on the welding end.

18 Claims, 12 Drawing Sheets

(58) Field of Classification Search
USPC .............. 310/71, 216.001, 216.005, 216.036
See application file for complete search history.

(56) References Cited

U.S. PATENT DOCUMENTS

| | | | | |
|---|---|---|---|---|
| 10,431,364 | B2* | 10/2019 | Stefanescu | H02K 3/04 |
| 2003/0127935 | A1* | 7/2003 | Mori | H02K 15/0081 |
| | | | | 310/206 |
| 2004/0135457 | A1* | 7/2004 | Holzheu | H02K 3/50 |
| | | | | 310/201 |
| 2008/0174199 | A1* | 7/2008 | Ishigami | H02K 3/28 |
| | | | | 310/214 |
| 2011/0012450 | A1* | 1/2011 | Umeda | H02K 3/50 |
| | | | | 310/71 |
| 2011/0133593 | A1* | 6/2011 | Nakamura | H02K 3/12 |
| | | | | 310/201 |
| 2011/0163625 | A1* | 7/2011 | Fukushima | H02K 3/12 |
| | | | | 310/198 |
| 2011/0175483 | A1* | 7/2011 | Koike | H02K 3/12 |
| | | | | 310/201 |
| 2012/0019081 | A1* | 1/2012 | Tamura | H02K 3/50 |
| | | | | 310/43 |
| 2014/0375156 | A1* | 12/2014 | Sugiura | H02K 3/28 |
| | | | | 310/71 |
| 2015/0061450 | A1* | 3/2015 | Nakagawa | H02K 3/28 |
| | | | | 310/198 |
| 2016/0111929 | A1* | 4/2016 | Kessler | H02K 3/522 |
| | | | | 310/71 |
| 2017/0033619 | A1* | 2/2017 | Tamura | H02K 3/28 |
| 2017/0033630 | A1* | 2/2017 | Tamura | H02K 3/18 |
| 2017/0093239 | A1* | 3/2017 | Teranishi | H02K 3/28 |
| 2017/0117768 | A1* | 4/2017 | Nakamura | H02K 15/085 |
| 2017/0264155 | A1 | 9/2017 | Nakayama | |
| 2018/0034339 | A1 | 2/2018 | Hashimoto et al. | |
| 2018/0097416 | A1* | 4/2018 | Dang | H02K 3/50 |
| 2018/0351428 | A1* | 12/2018 | Okamoto | H02K 3/28 |
| 2020/0395804 | A1* | 12/2020 | Ahmed | H02K 3/14 |
| 2021/0099039 | A1* | 4/2021 | Hanaoka | H02K 3/28 |
| 2021/0305864 | A1* | 9/2021 | Ahmed | H02K 3/48 |
| 2021/0313856 | A1* | 10/2021 | Ahmed | H02K 3/12 |
| 2021/0359567 | A1* | 11/2021 | Neet | H02K 3/12 |
| 2021/0384794 | A1* | 12/2021 | Tamura | H02K 3/522 |
| 2021/0391763 | A1* | 12/2021 | Yamamoto | H02K 3/34 |

FOREIGN PATENT DOCUMENTS

| | | |
|---|---|---|
| CN | 103490545 A | 1/2014 |
| CN | 104205575 A | 12/2014 |
| CN | 104767300 A | 7/2015 |
| CN | 106300716 A | 1/2017 |
| CN | 106410995 A | 2/2017 |
| JP | 2016032392 A | 3/2016 |
| WO | 2016158062 A1 | 10/2016 |

OTHER PUBLICATIONS

The World Intellectual Property Organization (WIPO) International Search Report for PCT/CN2018/108589 dated Dec. 6, 2018 5 Pages.

* cited by examiner

STATOR ASSEMBLY, MOTOR AND VEHICLE

CROSS-REFERENCE TO RELATED APPLICATIONS

The present application is a national phase entry under 35 U.S.C. § 371 of International Application No. PCT/CN2018/108589, filed on Sep. 29, 2018, which is based on and claims priority to Chinese Patent Application No. 201710912479.X, filed on Sep. 29, 2017, content of all of which is incorporated herein by reference in its entirety.

FIELD

The present disclosure relates to the technical field of vehicles, and in particular, to a stator assembly, a motor, and a vehicle.

BACKGROUND

In the related art, a lead-out line of a stator is led out from a molding end. To match a height of the lead-out line, a height of the molding end is generally set to a relatively large value. This is disadvantageous to optimization of an overall size of the stator and leads to structure complexity.

SUMMARY

The present disclosure aims to resolve at least one of the technical problems existing in the prior art. Therefore, the present disclosure provides a stator assembly. All lead-out lines of the stator assembly are located on a welding end, so that a structure of the stator assembly is simple and is beneficial to optimization of an overall size of the stator assembly.

The present disclosure also provides a motor that has the stator assembly.

The present disclosure also provides a vehicle that has the motor.

A stator assembly according to an embodiment of the present disclosure includes: a cylindrical stator core, where multiple stator slots spaced out along a circumferential direction of the stator core exist on the stator core; and a stator winding, where the stator winding includes multiple conductor segments, each of the conductor segments includes an intra-slot part disposed in a stator slot of the stator core, a first end and a second end that are disposed outside the stator core, the intra-slot part is connected between the first end and the second end, the second end of each of the multiple conductor segments forms a welding end, and a lead-out line from each phase of the stator winding is located at the welding end.

By making the lead-out line be located at the welding end, the stator assembly according to the embodiment of the present disclosure simplifies the structure and makes full use of the height space of the welding end, thereby being beneficial to optimization of the overall size of the stator assembly and facilitating connection between the lead-out line and a wiring terminal of an external circuit.

The motor according to the embodiment of the present disclosure includes the stator assembly provided in the present disclosure.

The motor according to the embodiment of the present disclosure improves overall performance of the motor by setting the stator assembly provided in the present disclosure.

The vehicle according to the embodiment of the present disclosure includes the motor provided in the present disclosure.

The vehicle according to the embodiment of the present disclosure improves overall performance of the vehicle by setting the motor provided in the present disclosure.

Additional aspects and advantages of the present disclosure will be given in the following description, some of which will become apparent from the following description or may be learned from practices of the present disclosure.

BRIEF DESCRIPTION OF THE DRAWINGS

The foregoing and/or additional aspects and advantages of the present disclosure will become apparent and comprehensible in the description made with reference to the following accompanying drawings, wherein.

REFERENCE NUMERALS

Figure 1:
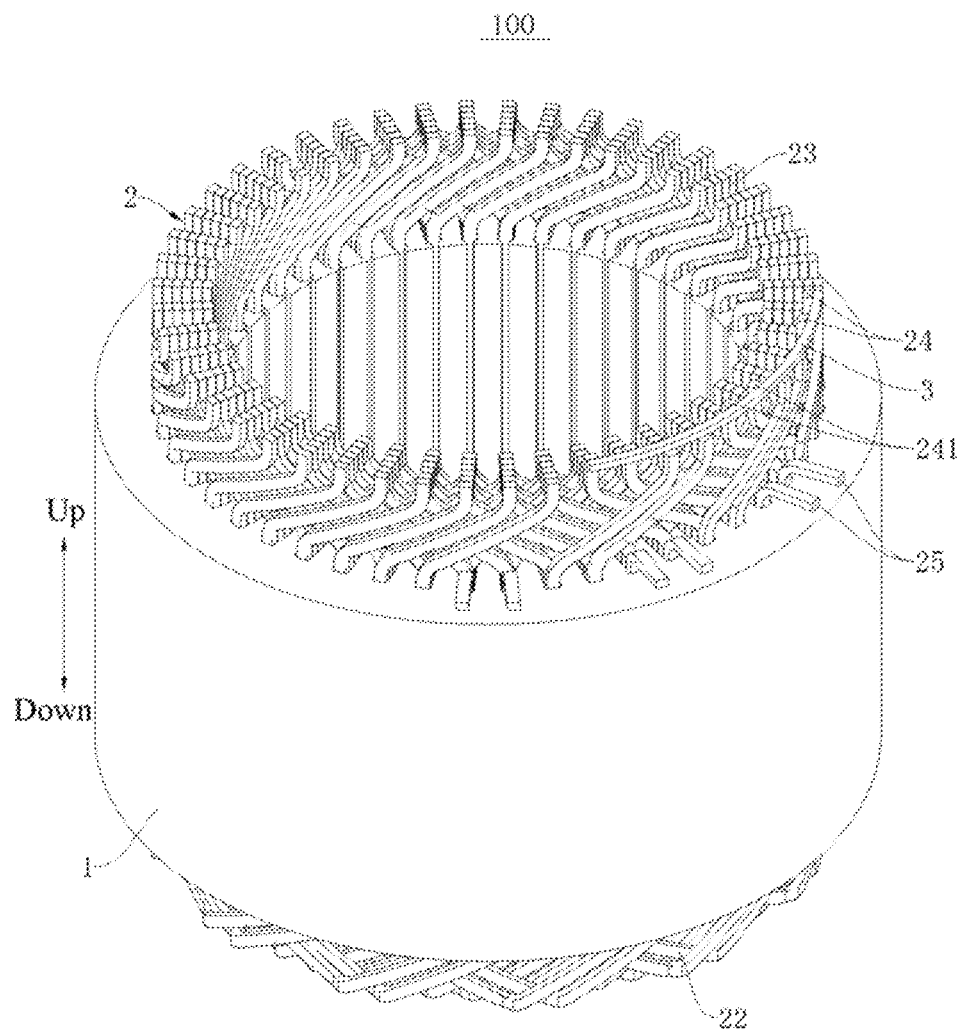
FIG. 1 is a schematic diagram of a stator assembly according to an embodiment of the present disclosure in which a terminal of a star point line extends upward.

Stator assembly 100, Stator core 1, Stator winding 2, a conductor segment 21, a U-shaped bend part 211, a first intra-slot part 212, a second intra-slot part 213, Hairpin end 22, welding end 23, Star point line 24, axial protrusion 241, radial protrusion 242, lead-out line 25, Neutral line 3, arc-shaped connector 31, antenna 32, first connection segment 321, second connection segment 322, bend segment 323, connection block 4, accommodation space 401, inner leg 41, outer leg 42, U-shaped bottom wall 43, Avoidance space 5, Motor 1000, vehicle 10000.

DETAILED DESCRIPTION

The following describes embodiments of the present disclosure in detail. Examples of the embodiments are shown in the accompanying drawings, and same or similar reference signs in all the accompanying drawings indicate same or similar components or components having same or similar functions. The embodiments described below with reference to the accompanying drawings are exemplary, and are intended to explain the present disclosure and cannot be construed as a limitation to the present disclosure.

In the description of the present disclosure, it should be understood that orientation or position relationships indicated by the terms such as "center", "length", "width", "thickness", "above", "below", "vertical", "horizontal", "top", "bottom", "inside", "outside", "axial", "radial", and "circumferential" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of the present disclosure. In addition, terms "first" and "second" are only used to describe the objective and cannot be understood as indicating or implying relative importance or implying a quantity of the indicated technical features. In view of this, a feature defined to be "first" or "second" may explicitly or implicitly include one or more features. In the description of the present disclosure, unless stated otherwise, the meaning of "a plurality of" is two or more than two.

In the description of the present disclosure, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. Persons of ordinary skill in the art may understand the specific meanings of the foregoing terms in the present disclosure according to specific situations.

A stator assembly 100 according to an embodiment of the present disclosure is described below with reference to FIG. 1 to FIG. 11. The stator assembly 100 according to the embodiment of the present disclosure may be used in an m-phase motor, where m=1, 2, 3 . . . That is, the stator assembly 100 may be used in a one-phase motor, a two-phase motor, a three-phase motor, and the like. The following description only uses an example in which the m-phase motor is a three-phase motor. Of course, after reading the following technical solution, a person skilled in the art apparently can understand other technical solutions in which the m-phase motor includes another number of phases. Therefore, such other technical solutions are omitted herein. Here, it should also be noted that each phase-specific winding of the stator winding has two ends, one end is a lead-out line 25 and the other end is a star point line 24.

As shown in FIG. 1, FIG. 2, FIG. 4, FIG. 6, FIG. 7, FIG. 9, and FIG. 10, the stator assembly 100 according to the embodiment of the present disclosure includes a stator core 1 and a stator winding 2.

Specifically, the stator core 1 is cylindrical, and multiple stator slots exist on the stator core 1. The stator slots are formed on an inner peripheral wall of the stator core 1, and run through the stator core 1 axially (for example, in the top-down direction shown in FIG. 1, FIG. 2, FIG. 4, FIG. 6, FIG. 7, FIG. 9, and FIG. 10). The multiple stator slots are spaced out in a circumferential direction of the stator core 1, and a depth direction of the stator core is the same as a radial direction of the stator core.

In an embodiment, a rotor of a three-phase motor includes eight magnetic poles. Correspondingly, the total number of stator slots disposed on the stator core 1 is 48.

The stator winding 2 includes multiple conductor segments 21. Each conductor segment 21 includes an intra-slot part disposed in a stator slot of the stator core 1, and a first end and a second end that are disposed outside the stator core 1. The intra-slot part is connected between the first end and the second end, and the second ends of the multiple conductor segments 21 form a welding end 23.

As shown in FIG. 1, each conductor segment 21 includes an intra-slot part (such as a first intra-slot part 212 and a second intra-slot part 213 described below) and a bend part. The intra-slot part is disposed in a stator slot, and the bend part is connected to the intra-slot part. After the intra-slot part runs through the stator slot, an end of the intra-slot part (for example, an upper end of the intra-slot part shown in FIG. 1) exceeds the stator core 1. The end of the intra-slot part (for example, the upper end of the intra-slot part shown in FIG. 1) forms a welding end 23 of the stator winding 2.

Specifically, all lead-out lines 25 of each phase of the stator winding 2 are located on the welding end 23. That is, all lead-out lines 25 of each phase of the stator winding 2 are led out of the welding end 23. Generally, an axial height of the welding end 23 is relatively great. By making the lead-out lines 25 located at the welding end 23, the technical solution in the present disclosure simplifies the structure and makes full use of the height space of the welding end 23, thereby being beneficial to optimization of the overall height size of the stator assembly 100 and facilitating connection between each lead-out line 25 and a wiring terminal of an external circuit.

By making the lead-out lines 25 be located at the welding end 23, the stator assembly 100 according to the embodiment of the present disclosure simplifies the structure and makes full use of the height space of the welding end 23, thereby being beneficial to optimization of the overall size of the stator assembly 100 and facilitating connection between each lead-out line 25 and the wiring terminal of the external circuit.

According to some embodiments of the present disclosure, all star point lines 24 of each phase of the stator winding 2 are located at the welding end 23. Further, the star point lines 24 of each phase of the stator winding 2 are a part of the welding end 23. Further, the stator assembly 2 further includes a neutral line 3. The neutral line 3 is connected to the star point lines 24 of each phase of the stator winding. In other words, each of the star point lines 24 of each phase is connected to the neutral line 3. In this way, a junction between the star point line 24 of each phase and the neutral line 3 occupies only a small space, and a connection manner is simpler.

Preferably, the neutral line 3 is an integrally molded part.

A specific embodiment of the stator assembly 100 of the present disclosure is described below.

Figure 2:
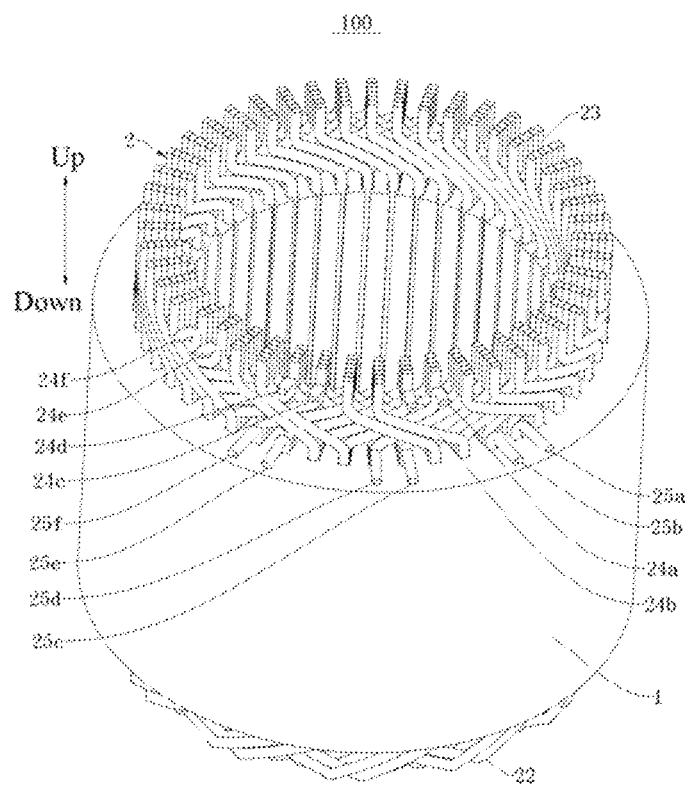
FIG. 2 is a schematic diagram of a stator assembly according to an embodiment of the present disclosure in which a terminal of a star point line bends outward.

As shown in FIG. 1 and FIG. 2, the stator assembly 100 in this embodiment is used in a three-phase motor. The stator winding 2 of the three-phase motor is a three-phase winding and includes a U-phase winding, a V-phase winding, and a W-phase winding. The number of parallel branches in each phase-specific winding is 2. That is, two branches are connected in parallel. Of course, the number of parallel branches of each phase-specific winding may also be 1, 3, 4, or 5 or more. The following description only uses an example in which the number of parallel branches of each phase-specific winding is 2. After reading the following technical solution, a person skilled in the art apparently can understand other technical solutions in which the number of parallel branches of each phase-specific winding is 1, 3, 4, or 5. Therefore, such other technical solutions are omitted herein.

When the three-phase winding adopts a Y-shaped connection (that is, a star connection), one end of each line in each phase-specific winding is a lead-out line 25 and the other end is a star point line 24. That is, the stator winding 2 has a total of six lead-out lines 25 and six star point lines 24. The lead-out lines 25 are used for electrical connection with an external circuit, and the star point lines 24 are connected together through a neutral line 3.

Specifically, as shown in FIG. 2, the six lead-out lines 25 of the three-phase winding are: a first U-phase lead-out line 25a, a second U-phase lead-out line 25b, a first V-phase lead-out line 25c, a second V-phase lead-out line 25d, a first W-phase lead-out line 25e, and a second W-phase lead-out line 25f. The six star point lines 24 of the three-phase winding are: a first U-phase star point line 24a, a second U-phase star point line 24b, a first V-phase star point line 24c, a second V-phase star point line 24d, a first W-phase star point line 24e, and a second W-phase star point line 24f.

Further, each of the six star point lines 24 is connected to the neutral line 3. That is, each star point line 24 in each phase is connected to the neutral line 3.

In the related art, the neutral line includes a UV connection line that connects a neutral point connection part of a U-phase winding and a neutral point connection part of a V-phase winding, and includes a VW connection line that connects a neutral point connection part of a V-phase winding and a neutral point connection part of a W-phase winding. The neutral line in the above technology uses two U-shaped lines to connect every two of the three connection parts. In this way, the welding part in the middle is thicker and occupies more space, and welding performance is hardly securable. Therefore, in the embodiment of the present disclosure, the axial and radial space of the stator assembly 100 occupied by the connection part between the neutral line 3 and the star point line 24 can be reduced, thereby making the structure more compact, simplifying the connection manner, and facilitating mass production.

By configuring the integrally formed neutral line 3 and connecting the star point lines 24 of each phase to the neutral line 3, the stator assembly 100 according to the embodiment of the present disclosure achieves the neutral line in the related art in which the neutral line uses two U-shaped lines to connect every two of three connection parts of the star point lines, thereby simplifying the connection structure of the star point line 24 and the neutral line 3, decreasing welding parts, and reducing the occupied axial and radial space of the stator assembly 100, making the structure compact, minimizing the space occupied by a casing and an end cover of the motor, and meeting miniaturization requirements of the motor.

In some embodiments, a cross section of the conductor segment 21, which is perpendicular to a length direction thereof, is non-circular. Preferably, the shape of the cross section of the conductor segment 21 is rectangular. The cross section of the conductor segment 21, which is perpendicular to the length direction thereof, is rectangular, so as to increase a full-slot ratio of coils in the stator slot. In other words, by configuring rectangular cross section of the conductor segment 21, more conductor segments 21 can be arranged in the stator slot of the same volume, so that the multiple conductor segments 21 in the stator slot are arranged more compactly. Of course, the cross section of the conductor segment 21, which is perpendicular to the length direction thereof, may also be another shape such as a trapezoid.

In some embodiments, the conductor segment 21 may be a U-shaped conductor segment. The U-shaped conductor segment includes a first intra-slot part 212 and a second intra-slot part 213 that are disposed in the stator slot. The first end of the conductor segment 21 is a U-shaped bend part 211 that connects one end of the first intra-slot part 212 and one end of the second intra-slot part 213. The U-shaped bend part 211 in each U-shaped conductor segment forms a hairpin end 22 of the stator winding, and the other end of the first intra-slot part 212 and the other end of the second intra-slot part 213 extend to form a welding end 23 of the stator winding.

Figure 3:
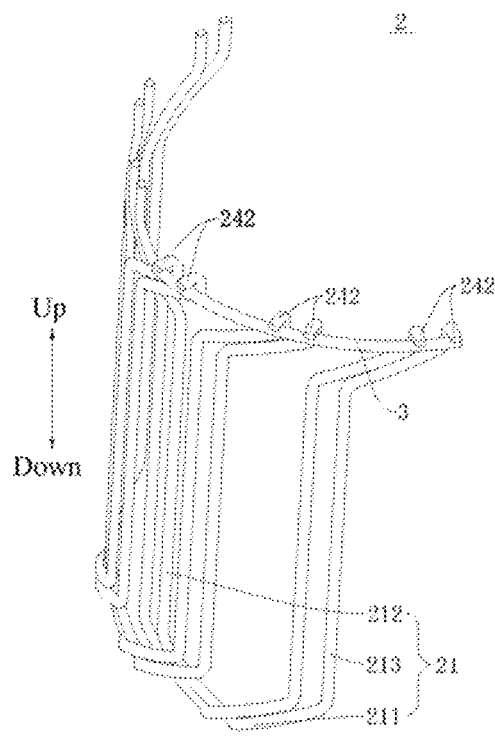
FIG. 3 is a schematic diagram of connecting a star point line shown in FIG. 2 to a neutral line.

Specifically, as shown in FIG. 1, the U-shaped conductor segment 21 includes a U-shaped bend part 211, a first intra-slot part 212, and a second intra-slot part 213. The first intra-slot part 212 and the second intra-slot part 213 are both disposed in the stator slot, and are connected to the U-shaped bend part 211. After the first intra-slot part 212 and the second intra-slot part 213 run through the stator slot, the ends thereof exceed the stator core 1. For example, as shown in FIG. 3, a lower end of the first intra-slot part 212 and a lower end of the second intra-slot part 213 are both connected to the U-shaped bend part 211, and an upper end of the first intra-slot part 212 and an upper end of the second intra-slot part 213 both run through the stator slot, and protrude out of the axial end of the stator core 1 (for example, the upper end of the stator core 1 shown in FIG. 1) to facilitate connection of multiple conductor segments 21.

The U-shaped bend part 211 in the multiple conductor segments 21 is located at a hairpin end 22 of the stator winding 2, and the other ends of the first intra-slot part 212 and the second intra-slot part 213 extend to form a welding end 23 of the stator winding 2. For clarity in the present disclosure, it is assumed that, in the drawing, the welding end 23 is located at the upper end, and the hairpin end 22 is located at the lower end.

Specifically, the neutral line 3 surrounds the welding end 23 of the stator winding 2 in a circumferential direction of the stator winding, thereby reducing a distance between the star point line 24 and the neutral line 3 and facilitating connection between the neutral line 3 and the star point line 24 of the welding end 23.

In some embodiments of the present disclosure, the star point lines 24 of each phase of the stator winding are directly connected through the neutral line 3. That is, all the star point lines 24 are directly connected to the neutral line 3, and the multiple star point lines 24 are connected together by being connected to the neutral line 3, rather than indirectly connected to the neutral line 3 through an intermediate transition connector (such as a connection block 4 described below). In short, by using the neutral line 3, all the star point lines 24 in the stator winding are connected together directly. In this way, the connection is convenient, simple, and quick. For example, each star point line 24 in each phase-specific winding in the stator winding 2 is directly welded to the neutral line 3.

When each phase includes multiple star point lines 24, the multiple star point lines 24 in each phase may be separately connected to the neutral line 3.

In addition, the multiple star point lines 24 in each phase may also be combined and connected together and then connected to the neutral line. Specifically, the multiple star point lines 24 in each phase may be directly welded, or welded through a connection bar. For example, the terminals of the multiple star point lines 24 in each phase extend upward vertically, the terminals of the multiple star point lines 24 in each phase are welded and connected together, and then welded to the neutral line 3.

In some examples, the star point lines 24 of each phase of the stator winding 2 are in surface contact with and welded to the neutral line 3. This improves connection efficiency and connection reliability. Here, the surface contact between the star point lines 24 and the neutral line 3 means that a surface at one side of a star point line 24 fits and contacts a surface at one side of the neutral line 3 to increase a contact area between the star point line 24 and the neutral line 3 and improve welding reliability. For example, the surface of each star point line 24 at the side facing the neutral line 3 fits and contacts the surface of the neutral line 3 at the side facing the star point line 24, and then welded and connected together.

In some examples, as shown in FIG. 1, the terminal of each star point line 24 of each phase of the stator winding 2 extends outward in an axial direction of the stator core (for example, in an upward direction shown in FIG. 1), and forms an axial protrusion 241. The neutral line 3 is connected to each axial protrusion 241.

Specifically, the axial protrusion 241 exceeds the end of the welding end 23 by a preset distance. The preset distance is greater than or equal to a length of the neutral line 3 in an axial direction of the stator core 1 (for example, in the top-down direction shown in the drawing). Preferably, the preset distance is greater than the length of the neutral line 3 in the axial direction of the stator core 1. Here, the length of the neutral line 3 in the axial direction of the stator core 1 means a height size of the neutral line 3 in the axial direction of the stator core 1.

Specifically, the neutral line 3 is welded to a radial outer surface of the axial protrusion 241. This simplifies the structure, facilitates welding, and reduces the occupation space in the radial direction.

Specifically, as shown in FIG. 1, in the top-down direction shown in FIG. 1, the terminal of the star point line 24 extends upward and an upper end face thereof is higher than an upper end face of the welding end 23. A distance between the upper end face of the star point line 24 and the upper end face of the welding end 23 is not less than the height of the neutral line 3 in the top-down direction. In this way, when the end of the star point line 24 is in-out opposite to and connected to the neutral line 3 in the radial direction of the stator core 1, the outermost line on the welding end 23 can be spaced apart from the neutral line 3 in the axial direction of the stator core 1 to avoid interference.

Here, it should be noted that the neutral line 3 may be welded at the end of the terminal of the star point line 24, or may be connected to a middle part of the terminal, which does not make much difference in the electrical connection effect.

As shown in FIG. 1, the star point lines 24 of each phase of the stator winding are located at a sub-outermost layer in the radial direction of the stator winding. That is, the star point lines 24 are located at a sub-outermost layer of the stator winding 2 in the radial direction of the stator core 1.

Here, it should be noted that the lead-out position of the star point lines 24 and the lead-out position of the lead-out lines 25 depend on the winding manner of the stator winding 2. The specific winding manner used by the stator assembly 2 in this embodiment will be described in detail below. After the stator assembly 2 according to this embodiment of the present disclosure finally completes winding by using the following winding manner, the star point lines 24 of each phase are located at the sub-outermost layer of the stator winding 2, the lead-out lines 25 of each phase are located at the outermost layer of the stator winding 2. When other winding manners are applied, the star point lines of each phase may be located at the outermost layer of the stator winding.

In some examples, as shown in FIG. 2 and FIG. 3, the terminal of each star point line 24 of each phase of the stator winding 2 may extend outward in a radial direction of the stator core 1 and bend at a preset angle to form a radial protrusion 242. The neutral line 3 is connected to each radial protrusion 242. This makes it convenient for the neutral line 3 to dodge, in the radial direction of the stator core 1, the outermost line on the welding end 23 to avoid interference.

When each phase includes multiple star point lines 24, all the terminals of the multiple star point lines 24 in each phase may extend outward in the radial direction of the stator core 1, and bend at a preset angle, and may be welded to neutral line 3 after being welded together and connected. This makes it convenient for the neutral line 3 to dodge, in the radial direction of the stator core 1, the outermost line on the welding end 23 of the stator winding to avoid interference.

Specifically, the radial protrusions 242 exceed the outermost layer of the stator winding by a preset distance, and the preset distance is greater than or equal to a length of the neutral line in the radial direction of the stator core. Preferably, the preset distance is greater than the length of the neutral line in the radial direction of the stator core. Here, the length of the neutral line in the radial direction of the stator core means a thickness size of the neutral line in the radial direction of the stator core.

Specifically, the neutral line is welded to a radial outer surface of the radial protrusion 242. This simplifies the structure, facilitates welding, and reduces the occupation space in the axial direction.

The neutral line 3 is further described below with reference to accompanying drawings.

In some embodiments, as shown in FIG. 1 and FIG. 3, the neutral line 3 may form an arc segment shape. In this case, the arc segment-shaped neutral line 3 may be substantially parallel to a circumferential direction of the stator core 1 to facilitate connection between the neutral line 3 and multiple star point lines 24 that are spaced out in a circumferential direction of the stator core 1.

Further, as shown in FIG. 3, a cross section of the neutral line 3 is circular or rectangular, and a cross section of the neutral line 3, which is perpendicular to the length direction thereof, may be circular; and the cross section of the neutral line 3, which is perpendicular to the length direction thereof, may also be rectangular, as shown in FIG. 1. Of course, the present disclosure is not limited to this, and the cross section of the neutral line 3, which is perpendicular to the length direction thereof, may also be oblate, polygonal, or of other shapes.

Figure 4:
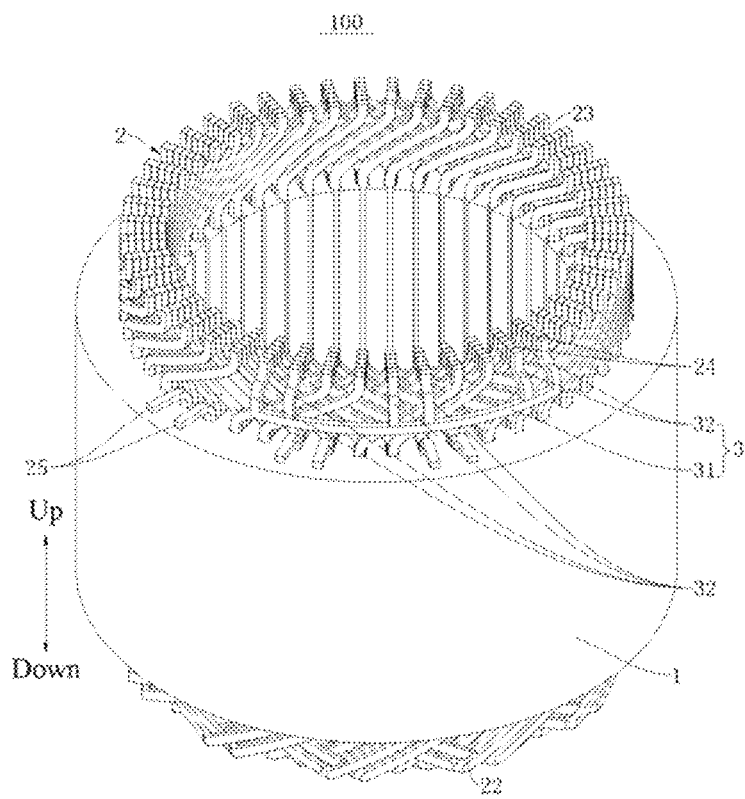
FIG. 4 is a schematic diagram of a stator assembly according to an embodiment of the present disclosure in which a neutral line has antennae.
Figure 5:
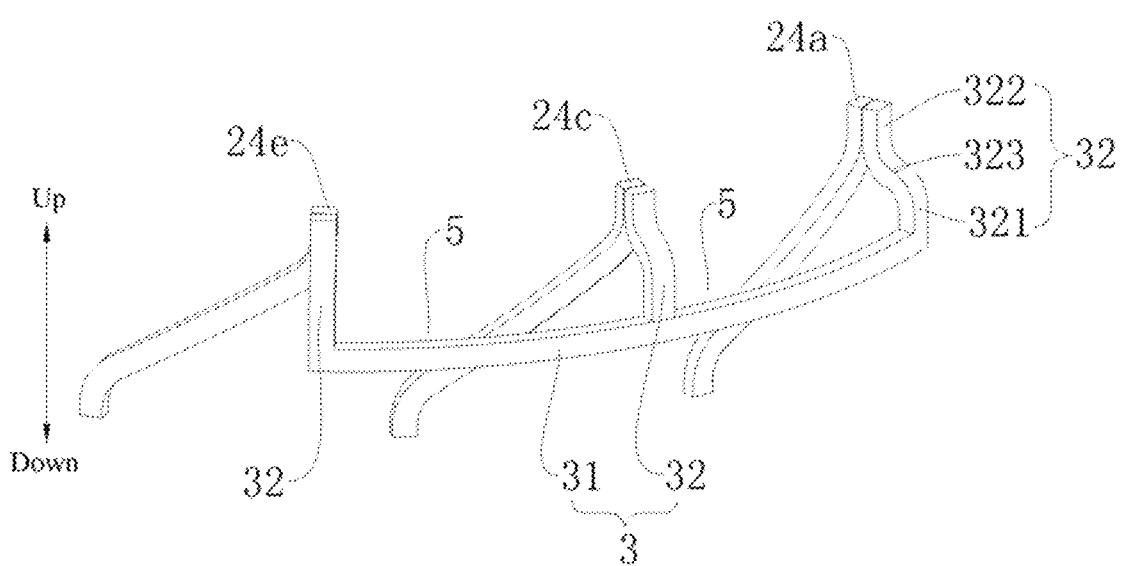
FIG. 5 is a schematic diagram of connecting a star point line of a stator assembly to a neutral line according to an embodiment of the present disclosure, in which a motor has three phases and each phase includes one line, and the neutral line has antennae.

As shown in FIG. 4 and FIG. 5, in some embodiments, the neutral line 3 may include an arc-shaped connector 31 and multiple antennae 32. The antennae 32 are each connected to the star point lines 24 of each phase of the stator winding, and the arc-shaped connector 31 connects the multiple antennae 32. Therefore, interference between the arc-shaped connector 31 and the outermost winding at the welding end 23 can be avoided.

Further, a gap exists radially between the arc-shaped connector 31 and the outermost layer of the stator winding. Therefore, interference between the arc-shaped connector 31 and a radial outermost winding at the welding end 23 can be further avoided.

The neutral line 3 may include multiple antennae 32 that are in one-to-one correspondence to the star point lines 24, so that each antenna 32 is connected to one corresponding star point line 24. For example, when the motor includes three phases and each phase-specific winding includes two parallel branches, a winding coil has six star point lines 24. In this case, the neutral line 3 applied to the stator assembly 100 has six antennae 32, as shown in FIG. 4. When the motor includes three phases and each phase-specific winding has one parallel branch, a winding coil has three star point lines 24. In this case, three antennae 32 may be configured on the neutral line applied to the stator assembly 100, as shown in FIG. 5.

As shown in FIG. 5, each antenna 32 may include a first connection segment 321, a second connection segment 322, and a bend segment 323. The bend segment 323 is connected between the first connection segment 321 and the second connection segment 322, the first connection segment 321 is connected to the arc-shaped connector 31, and the second connection segment 322 is welded to the terminal of the star point line 24.

Specifically, the first connection segment 321 and the second connection segment 322 smoothly transition through the bend segment 323.

Optionally, as shown in FIG. 5, the antenna 32 extends out of an upper surface of the arc-shaped connector 31, and both the first connection segment 321 and the second connection segment 322 extend upward. That is, the first connection segment 321 is connected to the upper surface of the arc-shaped connector 31 and extends upward, the bend segment 323 is connected to an upper end of the first connection segment 321, and a lower end of the second connection segment 322 is connected to the bend segment 323.

In addition, the first connection segment 321 of the antenna 32 may also extend inward from a radial inner surface of the arc-shaped connector 31, and the second connection segment 322 extends upward and is welded to the star point line 24 that extends outward (upward) in an axial direction of the stator core 1. For example, the first connection segment 321 is connected to the inner surface of the arc-shaped connector 31 and extends radially inward, the second connection segment 322 extends vertically upward, and the bend segment 323 is connected between the horizontal first connection segment 321 and the vertical second connection segment 322. In this case, the antennae 32 are substantially L-shaped.

Figure 6:
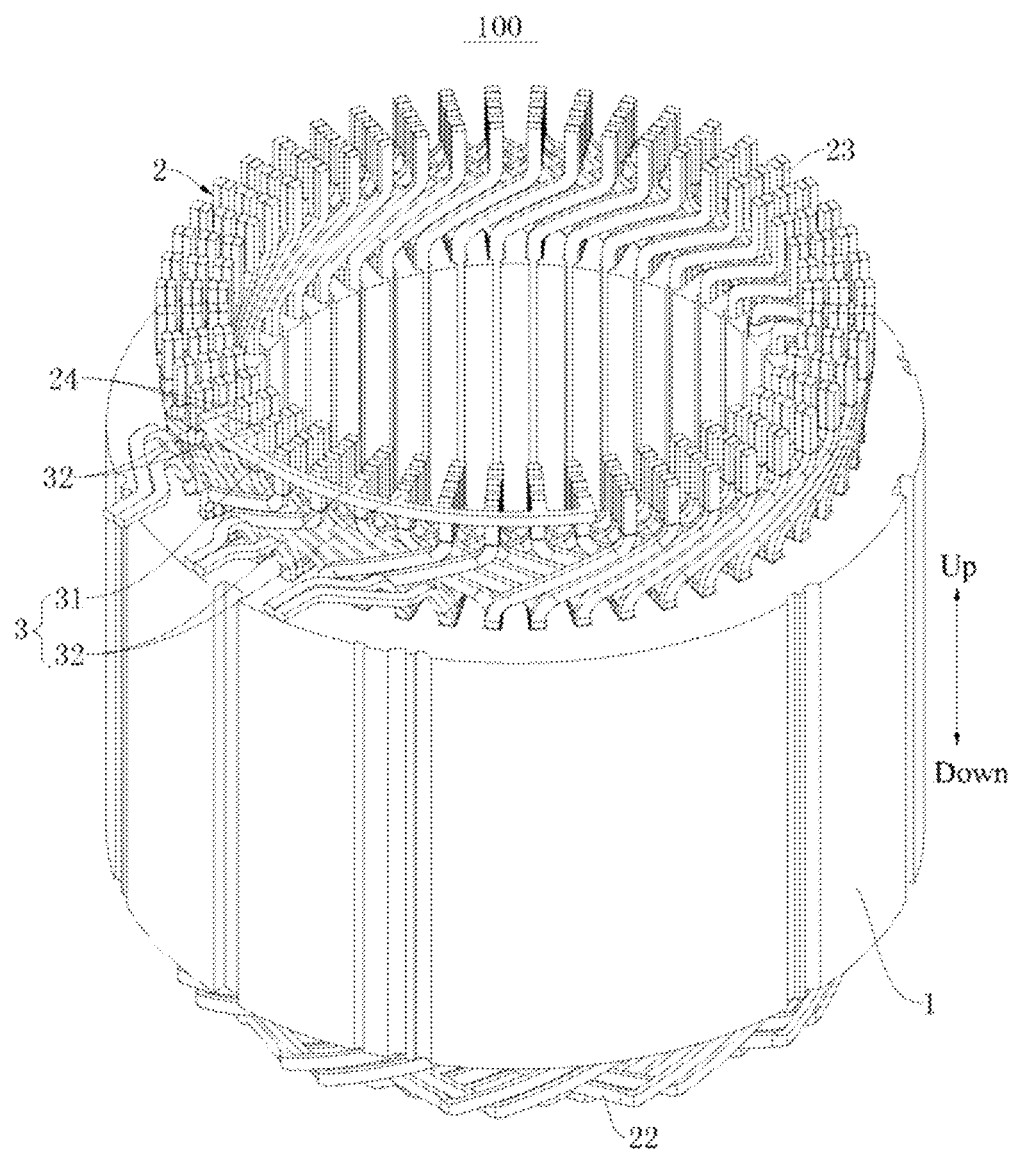
FIG. 6 is a schematic diagram of a stator assembly according to an embodiment of the present disclosure in which antennae of a neutral line take on straight lines.

Of course, the present disclosure is not limited to this. As shown in FIG. 6, the antennae 32 may also form a shape of a straight line segment, and the antennae 32 may extend inward from the radial inner surface of the arc-shaped connector 31, and the antennae 32 are welded to the terminal of the star point line 24. Further, the antennae 32 may be welded to an outward bent terminal of the star point line 24.

Specifically, as shown in FIG. 4, the star point lines 24 of each phase of the stator winding are located at the sub-outermost layer in the radial direction of the stator winding.

Here, it should be noted that when the neutral line 3 has antennae 32, at least a part of the antennae 32 extends radially inward. In this way, by welding the inward extending antennae 32 to the terminal of the star point line 24, it is convenient to space the arc-shaped connector 31 apart from the outermost winding of the welding end 23 to avoid interference. For example, when the neutral line 3 has antennae 32, after the antennae 32 on the neutral line 3 are connected to the star point lines 24, there is an avoidance space 5 between two adjacent corresponding antennae 32. The avoidance space 5 is suitable for accommodating the outermost layer of the stator winding located between the star point lines 24 of two adjacent phases.

Figure 7:
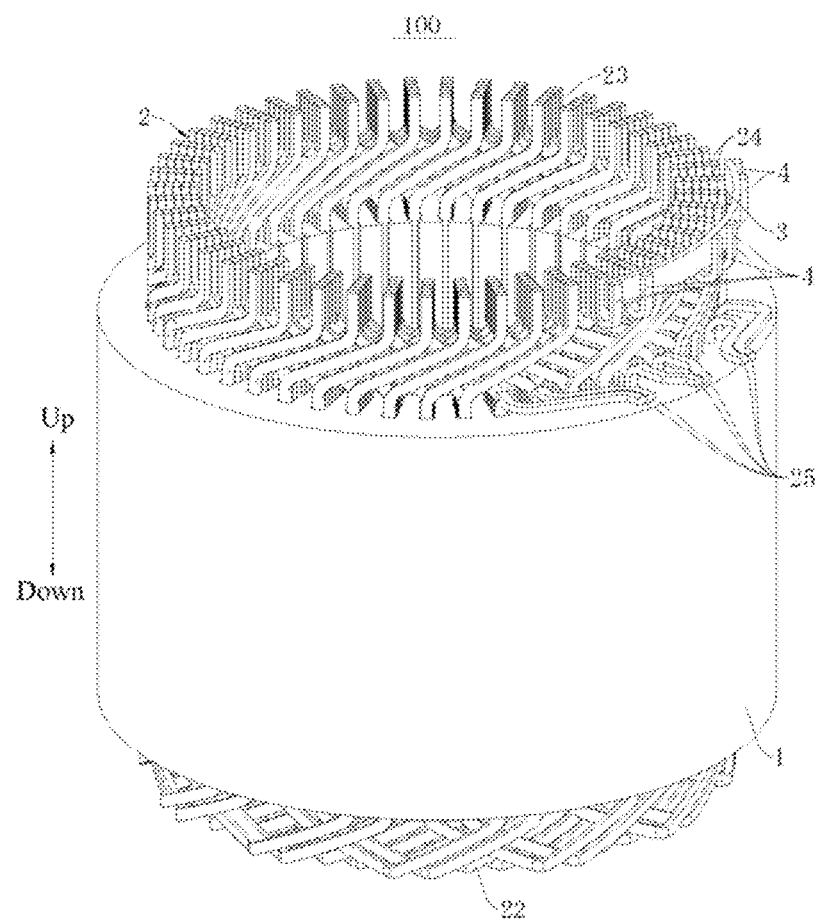
FIG. 7 is a schematic diagram of a stator assembly according to an embodiment of the present disclosure in which a neutral line is connected to a star point line through a U-shaped connection block.
Figure 8:
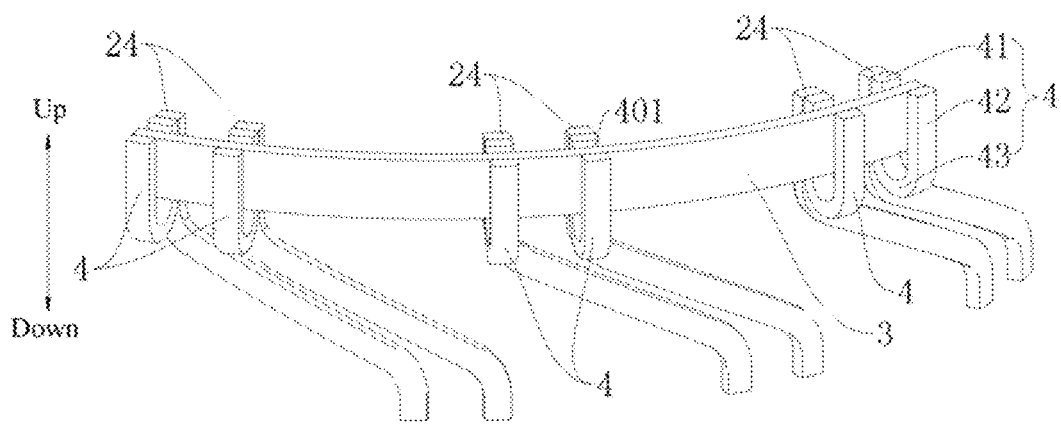
FIG. 8 is an enlarged view of connections between star point lines, a connection block, and a neutral line shown in FIG. 7.
Figure 9:
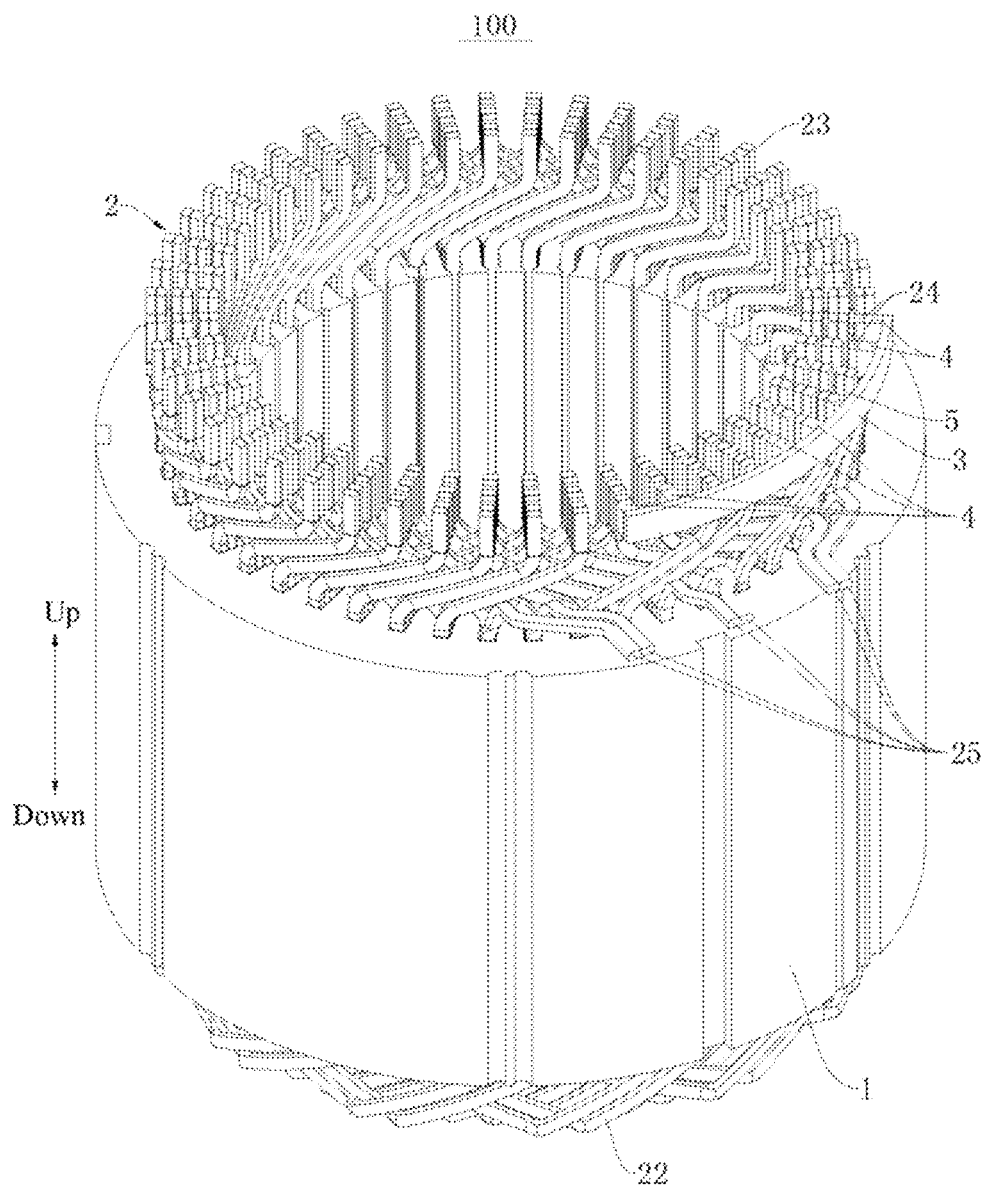
FIG. 9 is a schematic diagram of a stator assembly according to an embodiment of the present disclosure in which a neutral line is connected to a star point line through a cubic connection block.
Figure 10:
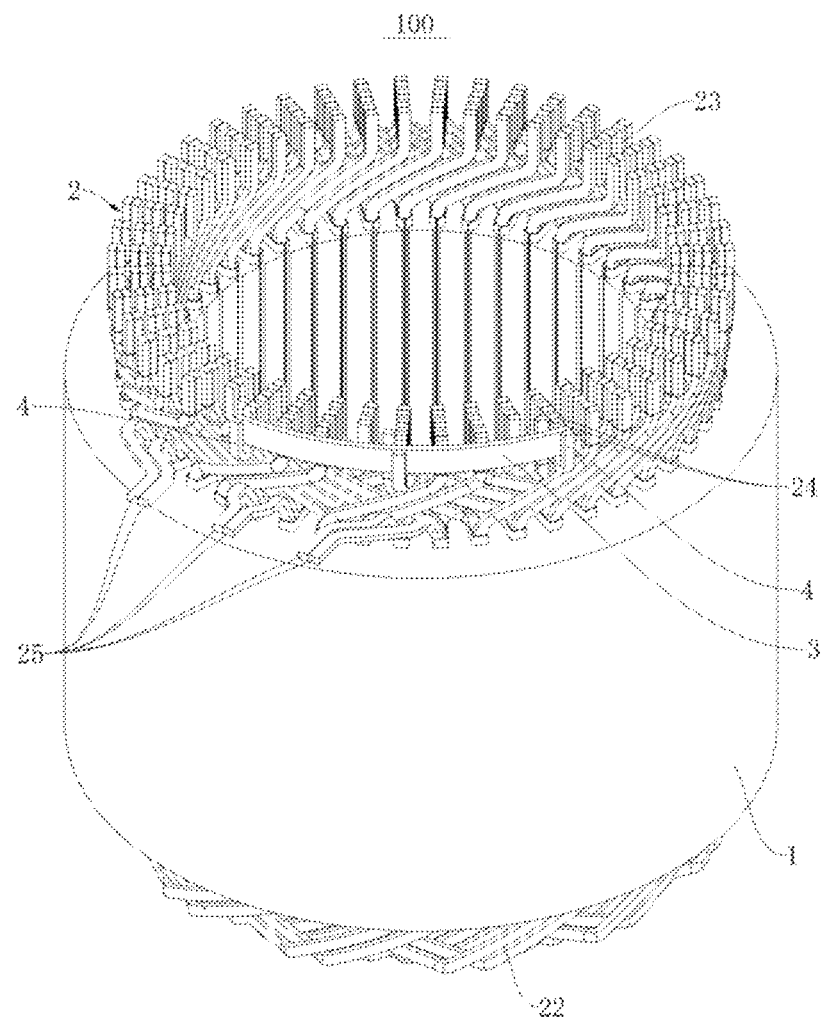
FIG. 10 is a schematic diagram of a stator assembly according to an embodiment of the present disclosure in which two star point lines in each phase are combined and then connected to a neutral line through a connection block.
Figure 11:
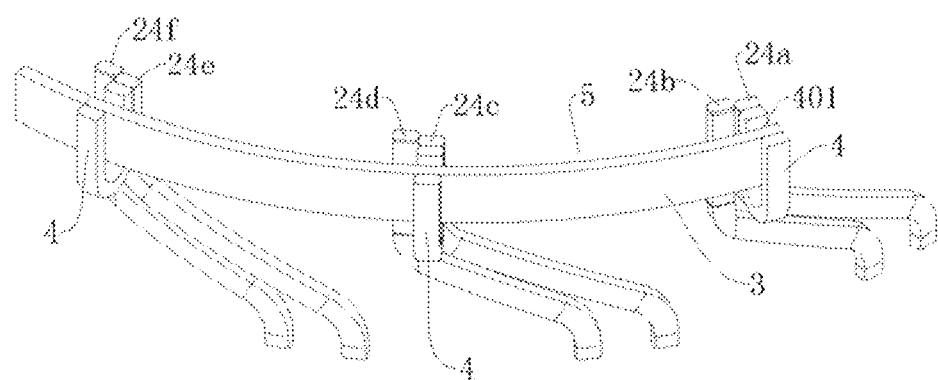
FIG. 11 is an enlarged view of connections between star point lines, a connection block, and a neutral line shown in FIG. 10.
Figure 12:
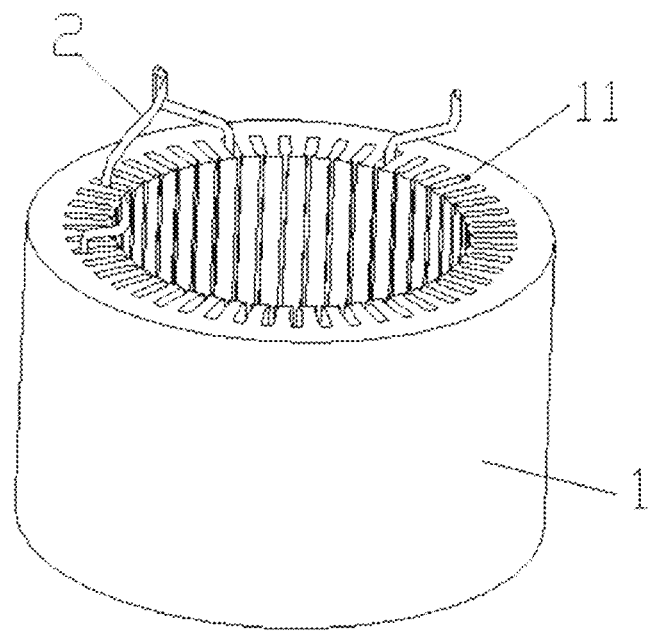
FIG. 12 is a schematic diagram of a stator core in a stator assembly according to an embodiment of the present disclosure.
Figure 13:
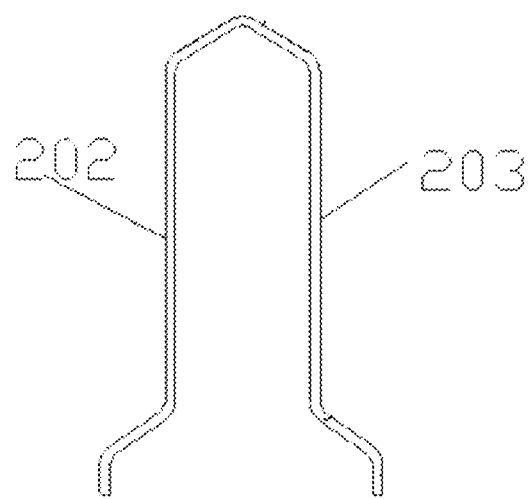
FIG. 13 is a schematic diagram of a U-shaped conductor segment in a stator assembly according to an embodiment of the present disclosure.
Figure 14A:
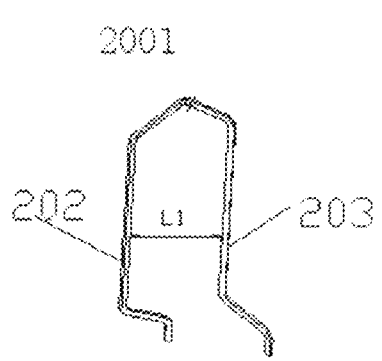
FIG. 14a to FIG. 14d are schematic diagrams of first to fourth U-shaped conductor segments used when a stator assembly is wound according to an embodiment of the present disclosure.
Figure 14B:
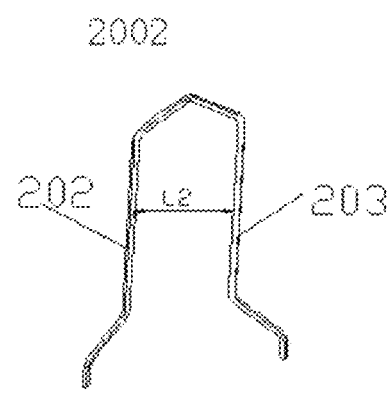
Figure 14C:
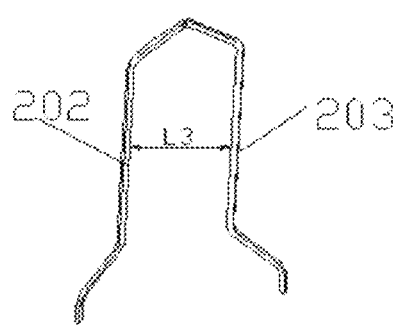
Figure 14D:
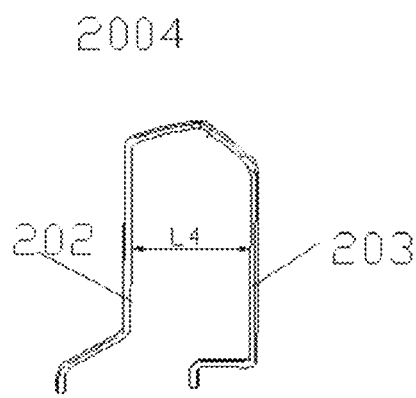

In some embodiments of the present disclosure, the neutral line 3 may also be indirectly connected to the star point line 24. Specifically, as shown in FIG. 7 to FIG. 9, the star point lines 24 of each phase of the stator winding are indirectly connected to the neutral line 3 through at least one connection block 4. Still as shown in FIG. 11, when each phase includes multiple star point lines, the combined multiple star point lines in each phase are indirectly connected to the neutral line through at least one connection block.

Of course, each star point line of each phase is indirectly connected to the neutral line through at least one connection block.

Referring to FIG. 8, multiple connection blocks 4 may exist, and the multiple connection blocks 4 are connected between the star point line 24 and the neutral line 3 in a one-to-one correspondence manner. By setting a connection block 4 for indirect connecting, the size of a single welding point can be reduced, applicability to one or more (parallel branches in each phase-specific winding) is achieved, the structure is stable, and it is convenient to replace the connection block 4. When each phase includes multiple star point lines, there may be multiple connection blocks that correspond to the multi-phase windings one to one, and the multiple connection blocks are connected one to one to the combined and connected star point lines in each phase.

Alternatively, there may be multiple connection blocks that are connected one to one to the star point lines in each phase.

Specifically, the star point lines 24 are in surface contact with and welded to the connection blocks 4, and the neutral line 3 is in surface contact with and welded to the connection blocks 4.

The connection blocks 4 are further described below with reference to FIG. 7 to FIG. 9.

In some examples, as shown in FIG. 9, two opposite surfaces of a connection block 4 are connected to the star point line 24 and the neutral line 3 respectively. Preferably, the two opposite surfaces of the connection block 4 are parallel. In this way, the structure is simplified, the implementation is easy, and less space is occupied. Here, when the star point line 24, the connection block 4, and the neutral line 3 are in-out opposite to each other in the radial direction of the stator core 1, the radial inner surface and the radial outer surface of the connection block 4 are connected to the star point line 24 and the neutral line 3 respectively. When the star point line 24, the connection block 4, and the neutral line 3 are top-down opposed to each other in the axial direction of the stator core 1, the upper surface and the lower surface of the connection block 4 are connected to the star point line 24 and the neutral line 3 respectively.

Specifically, as shown in FIG. 9, terminals of the star point lines of each phase of the stator winding 2 extend in the axial direction of the stator core 1, a radial inner surface of each connection block 4 is welded to a radial outer surface of the terminals of the star point lines 24, and the radial outer surface of the connection block 4 is welded to the neutral line 3.

When each phase includes multiple star point lines, the radial inner surface of each connection block may be welded to the radial outer surface of the terminal of any one of the multiple combined star point lines, and the radial outer surface of the connection block 4 is welded to the neutral line 3.

Alternatively, the radial inner surface of each connection block may be welded to the radial outer surface of the terminal of each star point line of each phase, and the radial outer surface of the connection block 4 may be welded to the neutral line 3.

Specifically, the terminal of each star point line 24 of each phase of the stator winding 2 may extend outward in the radial direction of the stator core 1 and bend at a preset angle to form a radial protrusion 242. The connection block is connected to the radial protrusion.

Specifically, in the axial direction of the stator core, the height of the connection block is not greater than the height of the terminal of the star point line. For example, as shown in FIG. 9, an upper end surface of the connection block is not higher than an upper end surface of the terminal of the star point line. This facilitates connection between the connection block and the star point line, and avoids occupation of additional space.

Specifically, in the axial direction of the stator core 1 (for example, the top-down direction shown in FIG. 9), the distance of the connection block 4 is less than or equal to the distance of the neutral line 3. Here, the distance of the connection block in the axial direction of the stator core means the height or size of the connection block in the axial direction of the stator core; and the distance of the neutral line means the height or size of the neutral line in the axial direction of the stator core. For example, neither end of the connection block 4 in the axial direction of the stator core 1 exceeds either end of the neutral line 3 in the axial direction of the stator core 1.

As shown in FIG. 9, the connection block 4 forms a cuboid shape, and both the cross section of the neutral line 3 and the cross section of the terminal of the star point line 24 are square. The radial inner surface and the radial outer surface of the connection block 4 fit and are welded to the star point line 24 and the neutral line 3 respectively. The upper surface of the connection block 4 is flush with the upper surface of the terminal of the star point line 24 and the upper surface of the neutral line 3, and the lower surface of the connection block 4 is flush with the lower surface of the neutral line 3.

Specifically, in the radial direction of the stator core 1, the cross-sectional area of the connection block 4 connected to all star point lines in each phase is greater than or equal to a sum of cross-sectional areas of all star point lines 24 in each phase. For example, when there is only one star point line in a phase-specific winding, the cross-sectional area of the connection block 4 in the radial direction is not less than the cross-sectional area of the star point line 24. When there are two parallel branches in a phase-specific winding, the cross-sectional area of the connection block 4 in the radial direction is not less than the sum of the cross-sectional areas of the two star point lines 24 in this phase. When there are three parallel branches in a phase-specific winding, the cross-sectional area of the connection block 4 in the radial direction is not less than the sum of the cross-sectional areas of the three star point lines 24 in this phase, so as to meet requirements of electrical connection between the connection block and the star point line. Specifically, according to a calculation formula of resistance, the resistance of a conductor is inversely proportional to the cross-sectional area of the conductor. Therefore, because the cross-sectional area of the connection block 4 is greater than or equal to the sum of the cross-sectional areas of the star point lines 24 in each phase in a direction perpendicular to the length direction thereof, and the resistance of a unit length of the connection block 4 is less than or equal to the resistance of a unit length of each star point line 24 in each phase, heat generated per unit length of the connection block 4 is less than or equal to heat generated per unit length of each star point line 24, thereby avoiding the problem of local overheat of the connection block 4.

In some examples, as shown in FIG. 7 and FIG. 8, an accommodation space 401 may exist in the connection block 4, and the neutral line 3 runs through and is accommodated in the accommodation space 401, thereby reducing the occupied space. In addition, during operation of a motor, vibration may occur to different degrees. The vibration tends to cause detaching of the welding part between the neutral line and the star point line. Therefore, the neutral line 3 runs through and is accommodated in the accommodation space 401, so that the connection between the neutral line and the accommodation space is more stable to prevent easy detaching of the neutral line. Optionally, the accommodation space 401 may form an arc shape, a U shape, or a polygon.

Specifically, as shown in FIG. 8, the terminal of the star point line 24 extends in the axial direction of the stator core (for example, in the top-down direction shown in FIG. 8). The connection block 4 is constructed as a U shape, and the connection block 4 may include an inner leg 41 and an outer leg 42. The inner leg 41 takes on a long strip shape that extends vertically away from the stator core 1 and in the axial direction of the stator core 1. The outer leg 42 also takes on a long strip shape that extends vertically away from the stator core 1 and in the axial direction of the stator core 1. The inner leg 41 and the outer leg 42 are spaced out in the radial direction of the stator core 1. In the radial direction of the stator core, the inner leg 41 is located inside the outer leg 42. The inner leg 41 is welded to the terminal of the star point line 24, and the neutral line 3 is welded between the inner leg 41 and the outer leg 42.

As shown in FIG. 11, when each phase includes multiple star point lines, the inner leg may be welded to the terminal of any of the multiple combined star point lines in each phase, and the neutral line is welded between the inner leg and the outer leg.

Alternatively, the inner leg may be welded to the terminal of each star point line of each phase, and the neutral line is welded between the inner leg and the outer leg.

Optionally, the neutral line 3 may be welded to the radial inner surface of the outer leg 42, and the neutral line 3 is spaced apart from a U-shaped bottom wall 43 connected to the bottom of the outer leg 42 and the inner leg 41. Of course, the present disclosure is not limited to this, and the neutral line 3 may also be welded to a U-shaped bottom wall 43 connected to the bottom of the outer leg 42 and the inner leg 41. That is, the neutral line 3 may also be welded to the U-shaped bottom wall 43, where the U-shaped bottom wall 43 is connected to the bottom of the outer leg 42 and the inner leg 41.

Further, as shown in FIG. 8, the top of the accommodation space 401 is open, so that the neutral line 3 can extend into the accommodation space 401 from top downward, and the assembling is convenient. Preferably, a top surface of the neutral line 3 is flush with a top surface of the connection block 4 to reduce the occupied space.

In some examples, the neutral line 3 is an arc-shaped line segment with a rectangular cross-section, and the neutral line 3 of the arc-shaped line segment is concentric with the stator core 1. This leads to uniform radial distances between neutral line 3 and multiple star point lines 24 that are spaced out circumferentially, and facilitates connection between the neutral line 3 and each star point line 24.

Further, a width of the neutral line 3 in the radial direction of the stator core 1 is less than a height of the neutral line 3 in the axial direction of the stator core 1, thereby reducing the space occupied in the radial direction and facilitating connection.

In some embodiments of the present disclosure, after the neutral line 3 is connected to the star point line 24, an avoidance space 5 is defined between the neutral line 3 and the welding end 23. The avoidance space 5 is adapted to accommodate the outermost layer of the stator winding located between the star point lines 24 of two adjacent phases. For example, as shown in FIG. 4, the neutral line 3 has multiple inward extending antennae 32. Each antenna 32 is welded to a corresponding star point line 24. After the antenna 32 on the neutral line 3 is connected to the star point line 24, an avoidance space 5 exists between corresponding antennae 32 of the two adjacent phases, and the outermost layer of the stator winding between the star point lines 24 of the two adjacent phases can be accommodated in the avoidance space 5 to avoid interference between the winding and the neutral line 3.

In some embodiments of the present disclosure, a span of the neutral line in a circumferential direction of the stator core is greater than or equal to a maximum span of the star point lines of each phase in the circumferential direction, so as to ensure that the neutral line is long enough to connect the star point lines of each phase. For example, as shown in FIG. 1, the length of the neutral line in the circumferential direction of the stator core is not less than a distance between two star point lines in the circumferential direction of the stator core, where two star point lines are spaced farthest apart in the star point lines of three phases. That is, the span of the neutral line in the circumferential direction is greater than or equal to the span of the star point lines of three phases in the circumferential direction, so that the neutral line can be connected to the star point lines of three phases.

Optionally, a cross-sectional area of the neutral line is greater than or equal to a cross-sectional area of the star point line of each phase.

Specifically, the cross-sectional area of the neutral line in a direction perpendicular to the length direction thereof is greater than or equal to the cross-sectional area of the star point line in a direction perpendicular to the length direction thereof.

In some embodiments of the present disclosure, the cross-sectional area of the neutral line 3 in the radial direction of the stator core is greater than or equal to the sum of the cross-sectional areas of all star point lines 24 in each phase. Specifically, when the number of winding parallel branches of the stator winding 2 is 1, the cross-sectional area of the neutral line 3 is greater than or equal to the cross-sectional area of the star point line 24; when the number of winding parallel branches of the stator winding 2 is 2, the cross-sectional area of the neutral line 3 is greater than or equal to the sum of the cross-sectional areas of the two branches, so as to meet requirements of electrical connection between the neutral line 3 and the star point line 24. Specifically, according to a calculation formula of resistance, the resistance of a conductor is inversely proportional to the cross-sectional area of the conductor. Therefore, because the cross-sectional area of the neutral line 3 is greater than or equal to the sum of the cross-sectional areas of the star point lines 24 in each phase in a direction perpendicular to the length direction thereof, and the resistance of a unit length of the neutral line 3 is less than or equal to the resistance of a unit length of each star point line 24 in each phase, heat generated per unit length of the neutral line 3 is less than or equal to heat generated per unit length of each star point line 24, thereby avoiding the problem of local overheat of the neutral line 3.

In some embodiments of the present disclosure, the neutral line 3 may be a flat line with a rectangular cross-section. Further, in an extension direction of the neutral line 3, the cross-sectional areas thereof are the same.

In some embodiments of the present disclosure, the neutral line 3 may be a crimped copper bar. The neutral line 3 may also be a copper wire with a circular cross-section. Of course, in some embodiments of the present disclosure, the neutral line 3 may also be a scattered line.

Preferably, the material of the neutral line 3 may be the same as that of the conductor segment 21, so as to improve reliability of the connection between the neutral line 3 and the star point line 24.

In some embodiments of the present disclosure, as shown in FIG. 11, the multiple star point lines 24 in each phase are combined and connected before being connected to the neutral line 3. Optionally, the multiple star point lines 24 in each phase may be directly welded, or welded through a connection bar.

For example, as shown in FIG. 11, the number of parallel branches of each phase-specific winding is 2. During the process of connecting the neutral line 3, two star point lines 24 in the same phase may be welded together first, and then one of the star point lines 24 is welded to the connection block 4, and the connection block 4 is welded to the neutral line 3.

In some embodiments of the present disclosure, as shown in FIG. 1 to FIG. 9, the number of winding parallel branches of the stator winding 2 is at least one, and each star point line 24 of each phase is separately connected to the neutral line 3.

According to some embodiments of the present disclosure, the terminals of the lead-out lines 25 in each phase are connected. Optionally, the multiple lead-out lines 25 in each phase may be directly welded, or welded through a connection bar. Nevertheless, the present disclosure is not limited to this. The terminals of the multiple lead-out lines 25 in each phase may be disconnected. For example, the terminals of the multiple lead-out lines 25 in each phase are arranged in parallel.

Further, the terminals of the lead-out lines 25 in each phase are directly connected to a wiring terminal of an external circuit. This not only simplifies the structure, but also saves a connection structure between the terminals of the lead-out lines 25 and the wiring terminal of the external circuit, and achieves simplicity and reliability.

Optionally, as shown in FIG. 1, FIG. 2, FIG. 4, FIG. 6, FIG. 7, FIG. 9, and FIG. 10, the lead-out lines 25 are located at the outermost layer in the radial direction, and the terminals of the lead-out lines 25 extend horizontally away from the central axis of the stator core 1. In other words, the terminals of the lead-out lines 25 extend outward in the radial direction of the stator core 1. This not only simplifies the structure, but also facilitates connection between the lead-out lines 25 and an external circuit.

Figure 19:
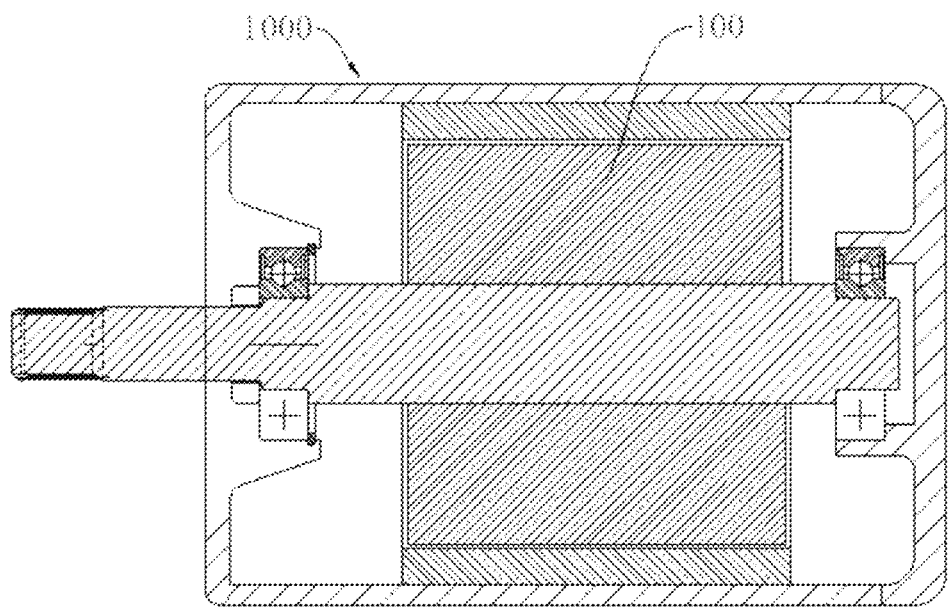
FIG. 19 is a schematic diagram of a motor according to an embodiment of the present disclosure.

Referring to FIG. 19, a motor 1000 according to an embodiment in the second aspect of the present disclosure includes a stator assembly 100 according to an embodiment in the first aspect of the present disclosure.

The structures and operations of other components such as a rotor of the motor 1000 according to the embodiment of the present disclosure are well known to those skilled in the art, and are omitted herein.

The motor 1000 according to the embodiment of the present disclosure improves overall performance of the motor 1000 by setting the stator assembly 100 according to an embodiment in the first aspect of the present disclosure.

Figure 20:
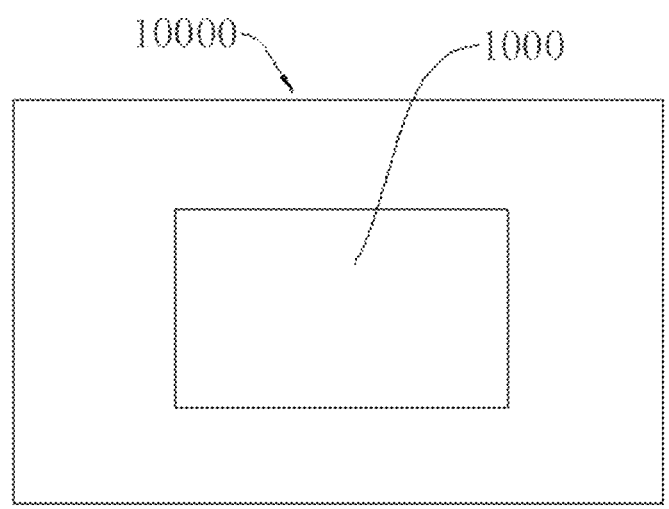
FIG. 20 is a schematic diagram of a vehicle according to an embodiment of the present disclosure.

Referring to FIG. 20, a vehicle 10000 according to a third aspect of the present disclosure includes a motor 1000 according to an embodiment of the second aspect of the present disclosure.

The vehicle 10000 according to the embodiment of the present disclosure improves overall performance of the vehicle 10000 by setting the motor 1000 according to an embodiment in the second aspect of the present disclosure.

Referring to FIG. 12 to FIG. 18, the following describes a winding method of a stator winding in a stator assembly according to an embodiment of the present invention using an example in which the stator assembly in the embodiment of the present disclosure is applied to an 8-pole 48-slot 3-phase motor. That is, the number of stator slots is z=48, and the number of phases is m=3, where three phases include U phase, V phase, and W phase; and the number of poles is 2p=8 (that is, the number of pole pairs is 4), and each of the three phases includes two lines.

Figure 15:
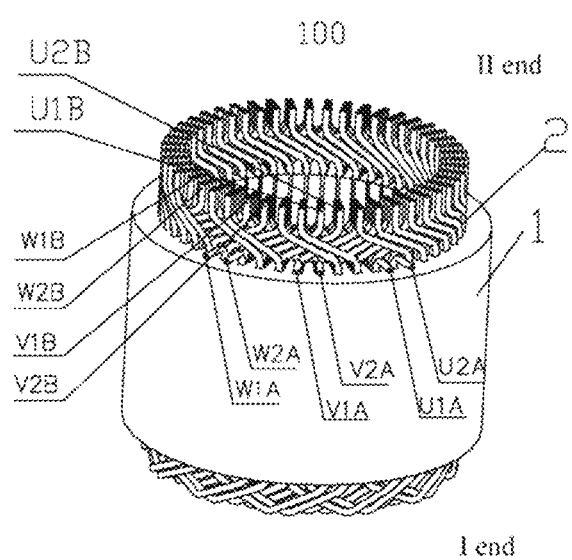
FIG. 15 is a schematic diagram of a default stator assembly according to an embodiment of the present disclosure in which 8 poles, 48 slots, and 3 phases are used as an example.

As shown in FIG. 15, in a stator winding 2 of a stator assembly 100, each pitch between a first intra-slot part 202 and a second intra-slot part 203 of a U-shaped conductor segment 20 is y stator slots, where y is an integer and y=z/2p. For an 8-pole 48-slot stator assembly 100, y=6. That is, the first intra-slot part 202 is spaced apart from the second intra-slot part 203 of each U-shaped conductor segment 20 by 6 stator slots.

In the following description, the present disclosure is described by using an example in which each stator slot 11 includes 6 layers. The 6 slot layers include layers a, b, c, d, e, and f arranged in sequence. In each stator slot 11, the innermost layer in the radial direction of the stator core 1 is layer a, and the outermost layer is layer f Explanation of the slot layers: Specifically, after the stator winding is inserted into the stator slot 11, multiple layers formed by the stator winding exist in the stator slot. In some embodiments of the present invention, the slot layers include layers a, b, c d, e, and f arranged in sequence. In each stator slot 11, the innermost layer in the radial direction of the stator core 1 is layer a, and the outermost layer is layer f.

In the stator assembly shown in FIG. 15, each star point line is spaced apart from the lead-out line of the U phase by 6 stator slots, and two lines of each phase are spaced out by 1 stator slot in the circumferential direction; adjacent corresponding star point lines in the U phase, the V phase, and the W phase are spaced out by 4 stator slots in the circumferential direction; and adjacent corresponding lead-out lines in the U phase, the V phase, and the W phase are spaced out by 4 stator slots in the circumferential direction.

Figure 16:
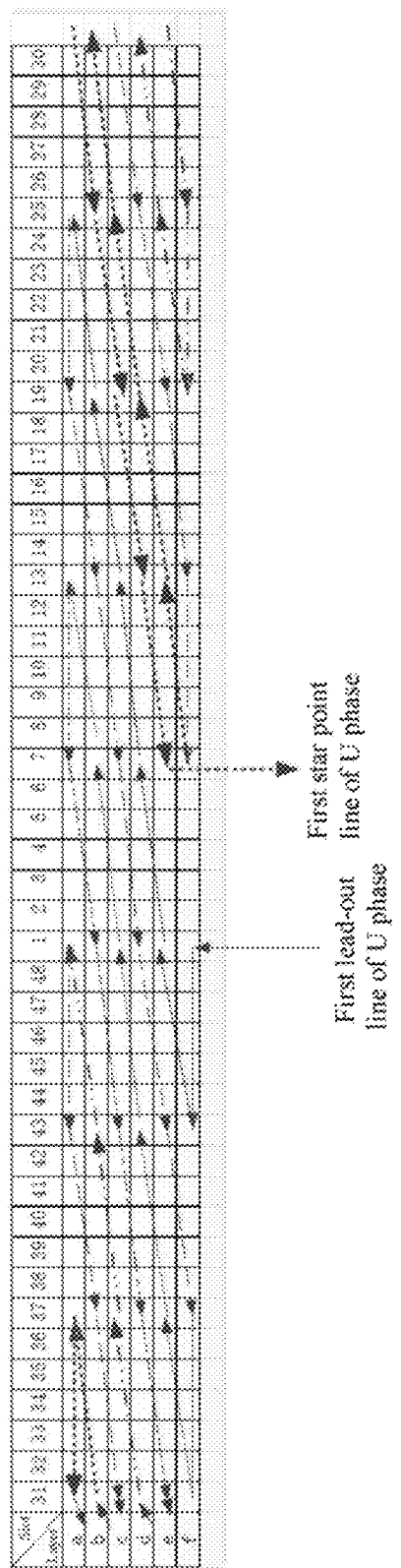
FIG. 16 is a schematic diagram of a winding manner of a stator assembly in FIG. 15, in which a first line of U phase is used as an example.
Figure 17:
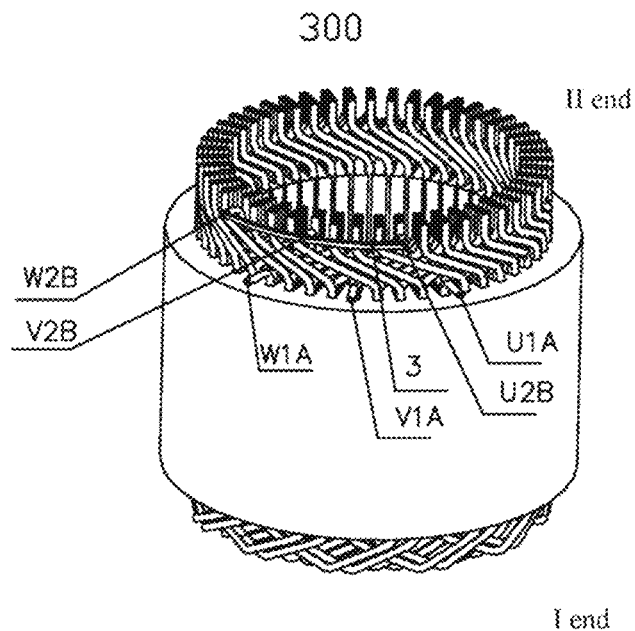
FIG. 17 shows a final stator assembly after a stator assembly in FIG. 15 is processed to form a 2-line wiring manner.

More specifically, as shown in FIG. 16 and FIG. 17, the first lead-out line U1A of the U phase is spaced apart from the second lead-out line U2A of the U phase by 1 stator slot, and the first lead-out line V1A of the V phase is spaced apart from the second lead-out line V2A of the V phase by 1 stator slot; and the first lead-out line W1A of the W phase is spaced apart from the second lead-out line W2A of the W phase by 1 stator slot.

As shown in FIG. 16 and FIG. 17, the first lead-out line U1A of the U phase is spaced apart from the first star point line U1B of the U phase by 6 stator slots, and the second lead-out line U2A of the U phase is spaced apart from the second star point line U2B of the U phase by 6 stator slots. Similarly, the lead-out line V1A of the V phase is spaced apart from the star point line V1B of the V phase by 6 stator slots, and the lead-out line V2A of the V phase is spaced apart from the star point line V2B of the V phase by 6 stator slots; the lead-out line W1A of the W phase is spaced apart from the star point line W1B of the W phase by 6 stator slots, and the lead-out line W2A of the W phase is spaced apart from the star point line W2B of the W phase by 6 stator slots.

Further, the adjacent corresponding star point lines in the U phase, V phase, and W phase are spaced out by 4 stator slots in the circumferential direction. Specifically, using the first line as an example, the first star point line U1B of the U phase, the first star point line V1B of the V phase, and the first star point line W1B of the W phase are spaced out by 4 slots at intervals in the circumferential direction. For example, as shown in FIG. 15, U1B is led out of layer e of slot 07, V1B is led out of layer e of slot 03, and W1B is led out of layer e of slot 47. Similarly, the second lines U2B, V2B, and W2B are led out of layer e of slot 08, layer e of slot 04, and layer e of slot 48 respectively, and are spaced out by 4 stator slots at intervals.

Correspondingly, the adjacent corresponding lead-out lines in the U phase, V phase, and W phase are spaced out by 4 stator slots in the circumferential direction. Specifically, using the first line as an example, the first lead-out line U1A of the U phase, the first lead-out line V1A of the V phase, and the first lead-out line W1A of the W phase are spaced out by 4 slots at intervals in the circumferential direction. For example, as shown in FIG. 15, U1A is led in from layer f of slot 01, V1A is led in from layer f of slot 45, and W1A is led in from layer f of slot 41. Similarly, the second lines U2A, V2A, and W2A are led in from layer f of slot 02, layer f of slot 46, and layer f of slot 42 respectively, and are spaced out by 4 stator slots at intervals.

The winding coil structure may be wound by using the following winding method. As shown in FIG. 16 and FIG. 17, using the first line of the U phase as an example, the winding route is as follows:

1f→43f→1e→7d→13c→19b→25a→19a→13b→7c→1d→43e→37f→31f→3
7e→43d→1c→7b→13a→7a→1b→43c→37d→31e→25f→19f→25e→31d→37c→43b→1a→43a→37b→31c→25d→19e→13f→7f→13e→19d→25c→31b→37a→31a→25b→19c→13d→7e where the winding route of the second line of the U phase is spaced apart from the first line of the U phase by 1 stator slot in the circumferential direction, the adjacent corresponding star point lines in the U phase, V phase, and W phase are spaced out by 4 stator slots in the circumferential direction; and the adjacent corresponding lead-out lines in the U phase, V phase, and W phase are spaced out by 4 stator slots in the circumferential direction.

When winding is performed by using the above coil winding method, multiple first U-shaped conductor segments 2001, multiple second U-shaped conductor segments 2002, multiple third U-shaped conductor segments 2003, and multiple fourth U-shaped conductor segments 2004 are applied. Still using the first line of the U phase as an example, referring to FIG. 16 and the above winding route, the winding is specifically as follows: The lead-out line U1A is led into the radial outermost slot layer 1f of the first slot (initial slot) on the welding end, and is connected to the first intra-slot part of the first U-shaped conductor segment 2001. The first U-shaped conductor segment 2001 spans 6 stator slots on the same layer in the reverse direction to reach 43f, where the forward direction is a rotation direction of the motor rotor, and the reverse direction is a reverse direction of the rotation direction of the motor rotor.

Multiple second U-shaped conductor segments 2002 span the stator slots in the forward direction and are connected in sequence, and each second U-shaped conductor segment 2002 spans 6 stator slots. The slot layer of the second intra-slot part of each second U-shaped conductor segment 2002 is more inward in the radial direction than the slot layer of the first intra-slot part by one layer until the second intra-slot part is located in the radially innermost slot layer. That is, one second U-shaped conductor segment 2002 spans from 43f to 1e, a next second U-shaped conductor segment 2002 spans from 1e to 7d, and so on, until reaching the radially innermost layer 25a of the 25$^{th}$ slot.

One third U-shaped conductor segment 2003 spans 6 stator slots on the same layer in the reverse direction to reach 19a.

Multiple fourth U-shaped conductor segments 2004 span the stator slots in the reverse direction and are connected in sequence, and each fourth U-shaped conductor segment 2004 spans 6 stator slots. The slot layer of the second intra-slot part of each fourth U-shaped conductor segment 2004 is more outward in the radial direction than the slot layer of the first intra-slot part by one layer until the second intra-slot part is located in the radially outermost slot layer. That is, one fourth U-shaped conductor segment 2004 spans from 19a to 13b, a next fourth U-shaped conductor segment 2004 spans from 13b to 7c, and so on, until reaching the radially outermost layer 37f of the 37$^{th}$ slot.

Then the foregoing settings are repeated by using the first U-shaped conductor segment 2001, the second U-shaped conductor segment 2002, the third U-shaped conductor segment 2003, and the fourth U-shaped conductor segment 2004 until the second intra-slot part of a fourth U-shaped conductor segment 2004 reaches an adjacent layer (that is, the sub-outermost slot layer 7e) of the radial outermost slot layer of the 7$^{th}$ slot (end slot) and is connected to the star point line U1B of this line in this phase, where the 7$^{th}$ slot (end slot) is spaced apart from the initial slot by 6 stator slots in the forward direction.

In some embodiments, for a stator assembly applicable to an 8-pole 48-slot 3-phase motor, an initial stator assembly 100 may be processed into a two-line solution or a one-line solution.

Figure 18:
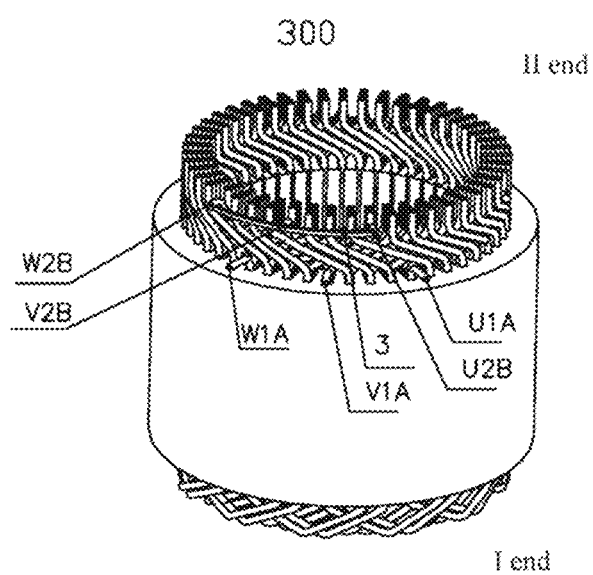
FIG. 18 shows a final stator assembly after a stator assembly in FIG. 15 is processed to form a 1-line wiring manner.

When a user chooses a two-line solution, the first star point lines U1B, V1B, and W1B and the second star point lines U2B, V2B, and W2B of the U phase, the V phase, and the W phase bend outward, and are welded and connected through the neutral line 3. As shown in FIG. 18, finally, the first lead-out lines U1A, V1A, and W1A and the second lead-out lines U2A, V2A, and W2A of the U phase, the V phase, and the W phase are welded through a welding terminal before being connected to an external controller interface.

When the user chooses a one-line solution, the second lead-out lines U2A, V2A, and W2A of the U phase, the V phase, and the W phase are stretched and bent, and then welded to the first star point lines U1B, V1B, and W1B of the U phase, the V phase, and the W phase respectively. The second star point lines U2B, V2B, and W2B bend outward and are welded and connected through the neutral line 3. Finally, the first lead-out lines U1A, V1A, and W1A of the U phase, the V phase, and the W phase are connected to the external controller interface after being welded together through a welding terminal.

Of course, depending on the number of stator slots, the number of poles, and the number of phases, the winding structure of each phase and each line varies.

For example, the number of stator slots is 72, the number of poles is 8, and the number of phases is 3, the three phases U phase, V phase, and W phase are included, and each phase includes three lines (not shown in the drawing), where each star point line of the U phase is spaced apart from the lead-out line by 9 stator slots 11, and every two of the three lines of the U phase are spaced out by 1 stator slot 11 in the circumferential direction; every two of the three lines of the V phase are spaced out by 1 stator slot 11 in the circumferential direction, every two of the three lines of the W phase are spaced out by 1 stator slot 11 in the circumferential direction, the corresponding star point lines of the U phase, the V phase, and the W phase are spaced out by 6 stator slots 11 in the circumferential direction, and the corresponding lead-out lines of the U phase, the V phase, and the W phase are spaced out by 6 stator slots 11 in the circumferential direction.

It is worth noting that, in some exemplary embodiments, at the welding end II of the coil winding, the star point lines of each line in any phase are located in the outermost layer in the radial direction, and the lead-out lines of each line in any phase are located in the sub-outermost layer in the radial direction. This facilitates the lead-in of the lead-out lines and the lead-out of the star point lines, and simplifies the structure of the entire coil winding.

In conclusion, based on the above winding method, the stator assembly 100 according to the embodiment of the present disclosure has welding points on only the welding end, and has no welding terminals on the hairpin end. The welding process is simple and convenient, the types of coils required for winding are few, and the devices required are few, so that it is easy to implement mass production. In addition, by using this winding method, the voltage difference of flat lines between adjacent slot layers in the same slot is smaller than that of the related art, thereby effectively reducing risks of motor insulation breakdown and achieving high reliability. In addition, it is easy to adjust the number of lines of the winding.

In the description of this specification, the description of the reference terms such as "an embodiment", "some embodiments", "exemplary embodiment", "example", "specific example", or "some examples" means that the specific features, structures, materials or characteristics described with reference to the embodiment or example are included in at least one embodiment or example of the present disclosure. In this specification, schematic descriptions of the foregoing terms are not necessarily directed at a same embodiment or example. Moreover, the specific features, structures, materials, or characteristics described may be combined in any one or more embodiments or examples in an appropriate manner.

Although the embodiments of the present disclosure have been shown and described, persons of ordinary skill in the art should understand that various changes, modifications, replacements and variations may be made to the embodiments without departing from the principles and spirit of the present disclosure, and the scope of the present disclosure is as defined by the appended claims and their equivalents.

What is claimed is:

1. A stator assembly, comprising:
    a cylindrical stator core, wherein multiple stator slots spaced out along a circumferential direction of the stator core exist on the stator core; and
    a stator winding, wherein the stator winding comprises multiple conductor segments, each of the conductor segments comprises an intra-slot part disposed in a stator slot of the stator core, a first end and a second end that are disposed outside the stator core, the intra-slot part is connected between the first end and the second end, the second end of each of the multiple conductor segments forms a welding end, and a lead-out line from each phase of the stator winding is located at the welding end, wherein:
    star point lines of each phase of the stator winding are located at the welding end;
    the stator assembly further comprises a neutral line, and the neutral line is connected to each of the star point lines; and
    terminals of the star point lines of each phase of the stator winding extend outward in an axial direction of the stator core and form axial protrusions, and the neutral line is connected to each of the axial protrusions.

2. The stator assembly according to claim 1, wherein a shape of a cross section of the conductor segment is rectangular; the conductor segments are U-shaped conductor segments, and each U-shaped conductor segment comprises a first intra-slot part and a second intra-slot part that are disposed in the stator slot, the first end is a U-shaped bend part that connects one end of the first intra-slot part and one end of the second intra-slot part; the U-shaped bend part of each U-shaped conductor segment forms a hairpin end of the stator winding, and the other end of the first intra-slot part and the other end of the second intra-slot part extend to form the welding end of the stator winding.

3. The stator assembly according to claim 1, wherein the star point lines of each phase of the stator winding are connected through the neutral line.

4. The stator assembly according to claim 1, wherein the star point lines of each phase of the stator winding are in surface contact with and welded to the neutral line.

5. The stator assembly according to claim 1, wherein the axial protrusions exceed an end of the welding end by a preset distance, and the preset distance is greater than or equal to a length of the neutral line in the axial direction of the stator core.

6. The stator assembly according to claim 1, wherein terminals of the star point lines of each phase of the stator winding extend outward radially around the stator core and bend at a preset angle to form radial protrusions, and the neutral line is connected to each of the radial protrusions.

7. The stator assembly according to claim 6, wherein the radial protrusions exceed an outermost layer of the stator winding by a preset distance, and the preset distance is greater than or equal to a length of the neutral line in a radial direction of the stator core.

8. The stator assembly according to claim 1, wherein the neutral line forms a shape of an arc segment, and a cross section of the neutral line is circular or rectangular.

9. The stator assembly according to claim 1, wherein the neutral line comprises an arc-shaped connector and multiple antennae, the multiple antennae are respectively connected to the star point lines of each phase of the stator winding, and the arc-shaped connector connects the multiple antennae.

10. The stator assembly according to claim 9, wherein a gap exists radially between the arc-shaped connector and the outermost layer of the stator winding.

11. The stator assembly according to claim 1, wherein the star point lines of the stator winding are indirectly connected to the neutral line through at least one connection block.

12. The stator assembly according to claim 11, wherein the star point lines are in surface contact with and welded to the connection block, and the neutral line is in surface contact with and welded to the connection block.

13. The stator assembly according to claim 11, wherein two opposite surfaces of the connection block are respectively connected to the star point lines and the neutral line, and the two opposite surfaces of the connection block remain parallel.

14. The stator assembly according to claim 13, wherein terminals of the star point lines of each phase of the stator winding extend in an axial direction of the stator core, a radial inner surface of each connection block is welded to a radial outer surface of the terminals of the star point lines, and a radial outer surface of the connection block is welded to the neutral line.

15. The stator assembly according to claim 11, wherein terminals of the star point lines extend in an axial direction of the stator core; and
    the connection block is constructed in a U shape and comprises an inner leg and an outer leg that are radially separated, the inner leg is welded to a terminal of the star point lines, and the neutral line is welded between the inner leg and the outer leg.

16. The stator assembly according to claim 1, wherein multiple connection blocks exist and are connected between the star point lines and the neutral line one by one.

17. A motor, comprising the stator assembly according to claim 1.

18. A vehicle, comprising the motor according to claim 17.

* * * * *